United States Patent
Hall, Jr.

(10) Patent No.: US 8,403,495 B2
(45) Date of Patent: Mar. 26, 2013

(54) MODULAR LED ILLUMINATION SYSTEM AND METHOD

(75) Inventor: Estill Thone Hall, Jr., Fishers, IN (US)

(73) Assignee: Shenzhen TCL New Technology Ltd., Shenzhen, Guangdong (CN)

( * ) Notice: Subject to any disclaimer, the term of this patent is extended or adjusted under 35 U.S.C. 154(b) by 307 days.

(21) Appl. No.: 12/740,999

(22) PCT Filed: Dec. 27, 2007

(86) PCT No.: PCT/US2007/088964
§ 371 (c)(1),
(2), (4) Date: Apr. 30, 2010

(87) PCT Pub. No.: WO2009/073041
PCT Pub. Date: Jun. 11, 2009

(65) Prior Publication Data
US 2010/0238364 A1    Sep. 23, 2010

(30) Foreign Application Priority Data
Dec. 4, 2007 (CN) .......................... 2007 1 0124804

(51) Int. Cl.
*G03B 21/14* (2006.01)
(52) U.S. Cl. ................ 353/38; 353/20; 353/30; 353/31; 353/33; 353/34; 349/9
(58) Field of Classification Search ............ 353/20, 353/30, 31, 33, 34, 37, 38, 94, 97–99; 362/26, 362/612, 551, 555, 582, 217.05, 241, 243, 362/245, 296.01, 341, 346; 349/5, 7, 8, 9; 359/618, 629, 634, 636, 640, 834, 833
See application file for complete search history.

(56) References Cited

U.S. PATENT DOCUMENTS
6,584,283 B2    6/2003   Gabello et al.
(Continued)

FOREIGN PATENT DOCUMENTS
CN    1554982       12/2004
EP    1645906 A1    4/2006
(Continued)

OTHER PUBLICATIONS

Extended European Search Report, EP 07866069, mailed Dec. 7, 2010.

*Primary Examiner* — Georgia Y Epps
*Assistant Examiner* — Sultan Chowdhury
(74) *Attorney, Agent, or Firm* — Fletcher Yoder

(57) ABSTRACT

The present invention is directed to an illumination system. The illumination system comprises a plurality of modules such that each module comprises a plurality of light emitting diodes (LEDs) adapted to emit light. The illumination system further comprises a plurality of lens elements disposed subsequent to the LEDs. Further, a number of the lens elements corresponds to a number of LEDs; such that the plurality of lens elements is adapted to redirect the light emitted by the LEDs on a plurality lenses. The illumination system further comprises a plurality of imagers disposed subsequent to the plurality of lenses, such that each of the imagers forms an image from the light provided by each of the lenses, respectively. Further, the images formed by the plurality of imagers are combined by a device, such as an X-cube, to form a single image that is further provided to a light pipe of a display system.

19 Claims, 3 Drawing Sheets

U.S. PATENT DOCUMENTS

| | | |
|---|---|---|
| 6,902,310 B2 | 6/2005 | Im |
| 7,059,731 B2 * | 6/2006 | Lee et al. .................. 353/99 |
| 7,077,525 B2 | 7/2006 | Fischer et al. |
| 7,261,453 B2 * | 8/2007 | Morejon et al. .............. 362/555 |
| 7,347,557 B2 * | 3/2008 | De Smet .................. 353/20 |
| 7,369,318 B2 | 5/2008 | Yang |
| 2004/0070736 A1 | 4/2004 | Roddy et al. |
| 2005/0237488 A1 | 10/2005 | Yamasaki et al. |
| 2006/0007407 A1 | 1/2006 | Matsui |
| 2006/0072078 A1 | 4/2006 | Kim et al. |
| 2006/0119941 A1 | 6/2006 | Yang et al. |
| 2006/0119943 A1 | 6/2006 | Yang |
| 2006/0146297 A1 | 7/2006 | Lee |
| 2006/0164607 A1 | 7/2006 | Morejon et al. |
| 2006/0221310 A1 * | 10/2006 | Kim et al. .................. 353/99 |
| 2006/0238716 A1 * | 10/2006 | Lee et al. .................. 353/20 |
| 2006/0279701 A1 * | 12/2006 | O'Donnell et al. .............. 353/20 |
| 2007/0229718 A1 * | 10/2007 | Hall, Jr. .................. 348/744 |
| 2009/0279180 A1 * | 11/2009 | Amitai et al. .................. 359/633 |
| 2010/0060859 A1 * | 3/2010 | Krijn et al. .................. 353/31 |
| 2010/0284201 A1 * | 11/2010 | Alasaarela et al. ........... 362/551 |

FOREIGN PATENT DOCUMENTS

| | | |
|---|---|---|
| JP | 2003-330106 A1 | 11/2003 |
| JP | 2006-058488 A | 3/2006 |
| KR | 10-2002-0065037 B1 | 8/2002 |
| KR | 10-2006-0062900 B1 | 6/2006 |
| WO | 2009/073040 A1 | 6/2009 |
| WO | 2009/073042 A1 | 6/2009 |
| WO | 2009/082499 A1 | 7/2009 |
| WO | 2009/097387 A3 | 8/2009 |

* cited by examiner

MODULAR LED ILLUMINATION SYSTEM AND METHOD

FIELD OF THE INVENTION

The present invention relates generally to video display and projection systems. More specifically, the present invention relates to illumination systems of video display and projection systems.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Typically, video display and projection systems employ an illumination system (for example, a light engine) for generating light ultimately used to form an image. Multi-imager systems, such as high temperature polysilicon (HTPS) systems or even digital light processor (DLP) systems typically employ a single illumination system that utilizes a specialized high pressure mercury arc lamp as an illumination source. The arc lamp is adapted to provide the illumination system with white light, which is subsequently split or dispersed using optical devices (e.g., color wheel, filters, etc.) into three primary colors, namely, red green and blue (RGB). Thereafter, the RGB light is combined using yet additional optical devices for generating a colored image.

The usage of arc lamps as an illumination source in video units has various shortcomings. For example, arc lamps used in the above systems may have a relatively short lifetime and may require frequent replacement. In addition, because the multiple imagers in the above systems are dependent on the single lamp as an illumination source, all of the imagers of the system can become simultaneously non-operational should the lamp malfunction. Further, replacement of the lamp may be cumbersome, requiring major disassembly of the entire display system and/or some of its elements. By further example, the above mentioned optical and other devices typically used to disperse and, thereafter, recombine the light may occupy a substantial amount of space within the illumination and projection systems in which they are employed. Accordingly, these optical devices may dictate that the video display unit in which they are disposed is undesirably large. In addition, mercury contained within some of the arc lamps render those lamps environmentally unfriendly.

BRIEF DESCRIPTION OF THE DRAWINGS

Advantages of the invention may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
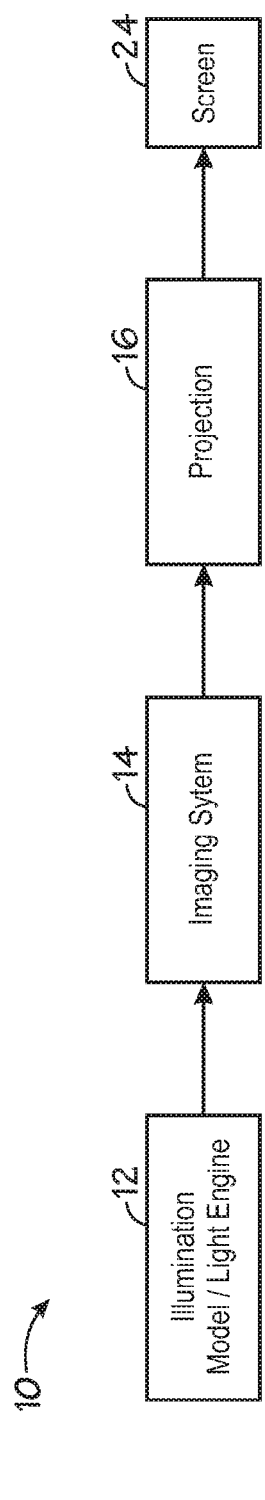
FIG. 1 is a block diagram of a video unit in accordance with an exemplary embodiment of the present invention.

Turning initially to FIG. 1, a block diagram of a video unit in accordance with one exemplary embodiment of the present invention is illustrated and generally designated by a reference numeral 10. In the illustrated embodiment, the video unit 10 may comprise a Digital Light Processing ("DLP") projection television or projector or the like. In another embodiment, the video unit 10 may comprise a liquid crystal display ("LCD") projection television or projector or the like. In still other embodiments, the video unit 10 may comprise a liquid crystal on silicon (LCOS) projector, a high temperature poly-silicon (HTPS) or another suitable form of projection television or display.

The video unit 10 includes a light engine/illumination system 12. The illumination system 12 is configured to generate white or colored light that can be employed by an imaging system 14 to create a video image. The illumination system 12 may be made up of multiple illumination systems, for example, such as those used in HTPS systems. As will be discussed in further detail below, the illumination system 12 includes optical and electro-optical components adapted to replace arc lamps otherwise used in conventional systems. The illumination system 12 includes module(s) having a collection of pulsed light emitting diodes (LEDs) adapted to emit, for example, RGB light at various intensities. As will be further shown below, the illumination system 12 further includes an optical device, referred to herein as a lenslet assembly. The lenslet assembly is a collection of lens elements whose number is equal to the number of the above-mentioned LEDs. The lenslet assembly is adapted to collect and further transmit the RGB light emanating from the LEDs onto an aperture. In this manner, the illumination system 12 is configured to efficiently convey the light provided by the illumination system 12 onward to a light pipe of the video unit 10. As those skilled in the art will appreciate, the term light pipe used herein refers to components and optical connections/coupling of the video unit 10 disposed subsequent to the illumination system 12. Such components of the video unit 10 may include an imaging system, a projection system, a screen, optical devices couplings and so forth.

Hence, the illumination system 12 utilizes a plurality of LEDs instead of an arc lamp as an illumination source. In other words, rather than employing a lamp for generating white light and components (e.g., color wheels, dichroic mirrors, polarizes, filters, etc.) for dispersing and separating the white light, the illumination system 12 efficiently combines the light produced by the LEDs at the outset to form colored and white light at various intensities. The video unit 10, therefore, may be made to be smaller in size as compared to those systems employing arc lamps and/or similar devices used for generating white light as an illumination source.

As described above, the illumination system 12 may be configured to project, shine, or focus colored light at the imaging system 14. The imaging system 14 may be configured to employ the colored light to create images suitable for display on a screen 24. It should be appreciated that the imaging system 14 may be made up of multiple imaging systems, such as those used in HTPS systems having multiple imagers. As illustrated below (FIG. 3), each of the multiple imagers included within the imaging system 14 may be individually coupled to an illumination source, similar to those included within the illumination system 12.

The imaging system 14 may be configured to generate one or more pixel patterns that can be used to calibrate pixel shifting in the video unit 10. In one embodiment, the imaging system 14 comprises a DLP imaging system that employs one or more DMDs to generate a video image using the colored light. In another embodiment, the imaging system 14 may employ an LCD projection system. It will be appreciated, however, that the above-described exemplary embodiments are not intended to be exclusive, and that alternate embodiments, any suitable form of imaging system 14 may be employed in the video unit 10.

The imaging system 14 illustrated in FIG. 1 may be configured to project images into a projection lens assembly 16. The projection lens assembly 16 may include one or more lenses and/or mirrors that project the image created by the imaging system 14 onto the screen 24.

Figure 2:
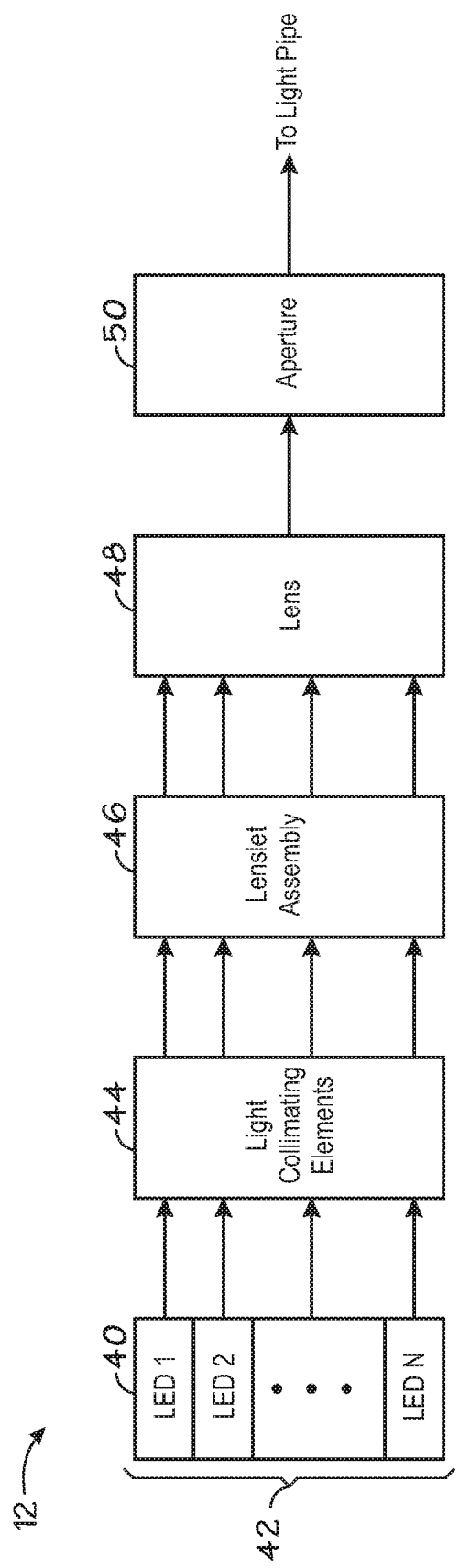
FIG. 2 is a block diagram of an illumination system in accordance with an exemplary embodiment of the present invention.

FIG. 2 is a block diagram of the illumination system 12 in accordance with an exemplary embodiment of the present invention. As mentioned above, the illumination system 12 includes light generating and collecting components adapted to convey the colored light to imaging and projection devices of the video unit 10 (FIG. 1). The illumination system 12 includes an LED module 40 adapted to house a plurality of LEDs 42. Each of the LEDs 42 may be pulsed at a certain fast rate. Further, each of the LEDs 42 contained within the module 40 may be adapted to emit red, green or blue light. Other embodiments may incorporate LEDs, i.e., LEDs 42, adapted to emit light of various colors, some of which may be different from red, green or blue. In addition, the module 40 may be adapted to house N LEDs. In an exemplary embodiment, the module 40 may be adapted to house up to eleven LEDs. In other exemplary embodiments, the module 40 may include up to five or seven LEDs. In still other exemplary embodiments, the illumination system 12 may be adapted to include multiple LED modules, such as the modules 40. In such embodiments, each of the modules 40 may be adapted to house a different number of LEDs. It should be noted that the number of LEDs included within each of the modules 40 may be determined by system design and/or operation criteria and/or by cost effective goals.

Hence, the module 40 is adapted to house combinations of RGB LEDs. Such combinations can be used, for example, to accentuate and/or suppress light of a specific color. For instance, a suitable combination of LEDs can configure the video unit 10 to produce images having hues that are relatively greater in red than blue. This may be achieved by including within the module 40 a greater number of LEDs producing red light than those LEDs producing blue light. Similarly, the module 40 may be adapted to house other combinations of LEDs, such as those envisioned to output light with enhanced and/or suppressed color(s) of different kinds.

The ability to incorporate and/or change the amount of LEDs within the illumination system 12 is facilitated by a modular design of the module 40. That is, each of the LEDs 42 may be independently coupled to the module 40 such that one or more of the LEDs 42 can be replaced and/or removed form the module 40 with minimal effort. Further, should one or more of the LEDs 42 malfunction or otherwise become idle, the video unit 10 may continue to project images despite some loss in color and/or brightness. Hence, unlike systems employing arc lamps whose malfunction renders the entire video unit nonfunctional, the present technique enables the video unit to continue operating even though one or more of the LEDs is non operational. Further, those skilled in the art will appreciate that the average lifetime of an LED is far greater than the average lifetime of an arc lamp. This yet provides another advantage of using the LEDs 42 as an illumination source rather the mercury lamp used in conventional systems.

The illumination system 12 further includes a plurality of light collimating elements or collimators 44 adapted to efficiently collect the light produced by the LEDs 42. In an exemplary embodiment, each of the collimators 44 may be disposed near or directly adjacent to each of the LEDs 42. In other exemplary embodiments, each of the collimators 44 may surround each of the LEDs 42 such that the LEDs 42 may be partially embedded within the collimators 44. Each of the collimators 44 is adapted to intake a maximal amount of light emanating from the LED to which the collimator is coupled. In so doing, the collimators 44 increase the light gathering ability of the illumination system 12. This ensures that the majority of the light produced by the LEDs 42 can be efficiently provided to and utilized by subsequent optical components of the video unit 10 for generating an image.

The illumination system 12 further includes a lenslet assembly 46. The lenslet assembly 46 includes a plurality of optical components, referred to herein as lenslets or lens elements. Hence, the lenslet assembly 46 is a collection of individual lenslets or lens elements. The number of lenslets included in the lenslet assembly 46 corresponds to the number of LEDs 42 included in the module 40. Each of the lenslets is adapted to receive light emitted by a respective LED 42 and collimator 44. Further, after receiving the light for the respective LED, each of the lenslets of the assembly 46 is adapted to redirect the light onto a lens 48 disposed subsequent to the lenslet assembly 46. As will be further shown below, each of the lenslets 46 is geometrically oriented relative to an axis for optimally receiving and redirecting the light emanating from each of the respective LEDs 42 onto the lens 48. In so doing, the lenslets 46 ensure that the lens 48 receives and collects a maximal amount of light emitted by the LEDs 42. Further, once the lens 48 receives the redirected light, the lens 48 focuses the light onto an aperture 50. The aperture 50 is adapted to transmit the light into a light pipe comprising additional imaging and projection components, as discussed hereinabove in relation to FIG. 1.

The lenslet assembly 46 is adapted to provide a unique intensity distribution at the aperture 50 for each of the LEDs 42. The intensity distribution for each of the LEDs 42 at the aperture 50 depends on the location of each of the LEDs 42 in module 40 and on the orientation of the respective lenslets 46 relative to lens 48. By virtue of including the lenslet assembly 46 within the illumination system 12, proper intensity levels of the LEDs 42 are obtained at the aperture 50 for projecting an image. In other words, absent the lenslet assembly 46, the light emerging from the LEDs 42 cannot be collected efficiently at aperture 50 for projecting a viewable image.

Figure 3:
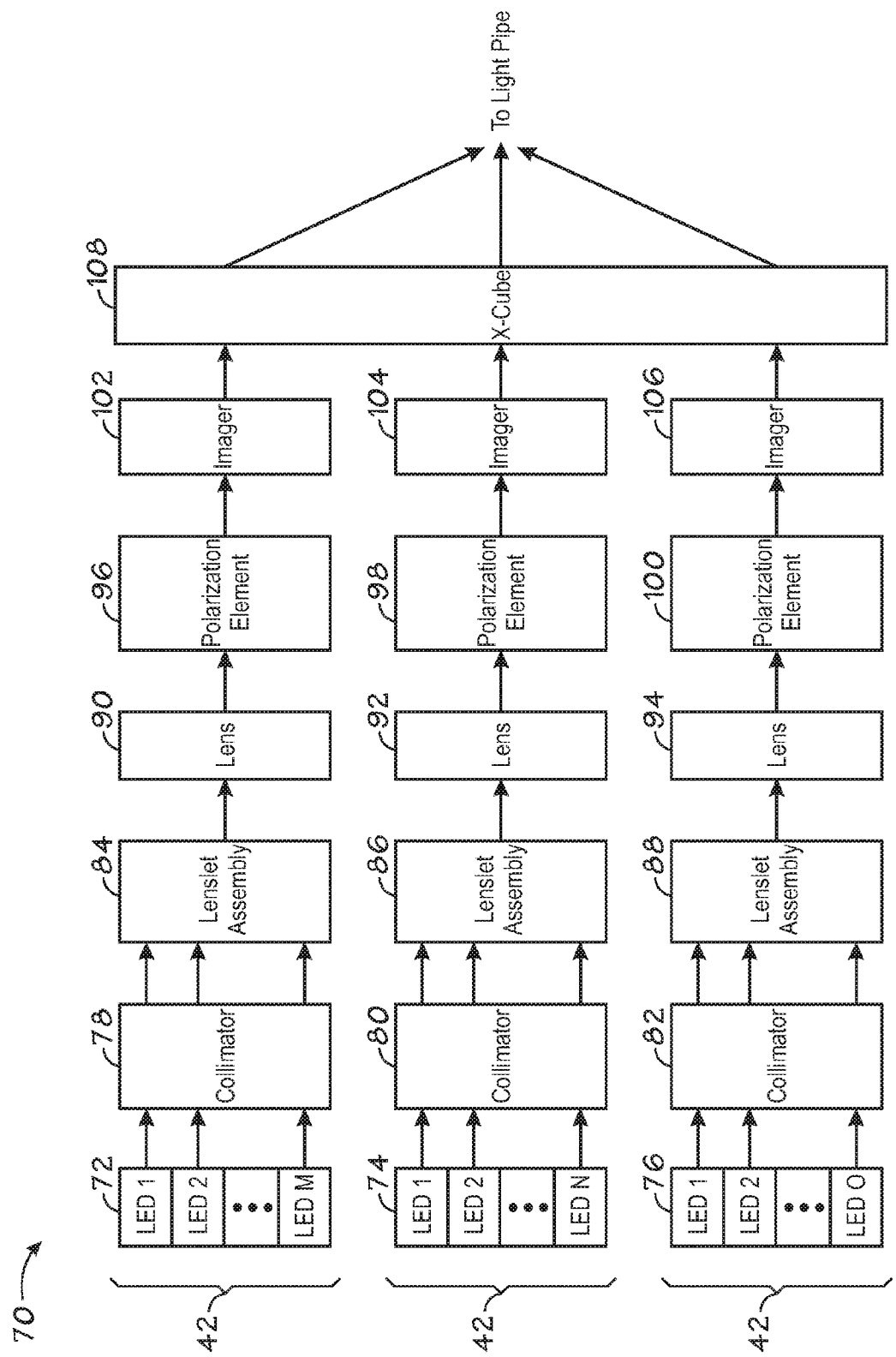
FIG. 3 is block diagram of an illumination system used in conjunction with a multi-imager system, in accordance with an exemplary embodiment of the present invention.

FIG. 3 is a block diagram of an illumination system used in conjunction with a multi-imaging system, in accordance with an exemplary embodiment of the present technique. Illumination system 70 includes multiple components similar to those discussed above in relation to the illumination system 12 of FIG. 2. Hence, the illumination system 70 is adapted for display units employing multiple imagers. Such display units may include HTPS systems or large projectors used to project very large images, such as those, encountered, for example, in theaters, cinemas or the like.

As illustrated, the illumination system 70 includes three illumination modules 72, 74 and 76, similar to the module 40 (FIG. 2), whose characteristics and attributes are incorporated herein by reference. Other exemplary embodiments may incorporate a different number of illumination modules (e.g., modules 72-76) for accommodating video units with a corresponding number of imagers. Further, each of the modules 72-76 includes a plurality of LEDs, such as the LEDs 42 discussed in relation to FIG. 2. It should be appreciated that the modules 72-76 may each house a different amount of LEDs. As illustrated by FIG. 3, the total number of LEDs housed within each of the modules 72-76 is denoted by M, N and Q, respectively.

In an exemplary embodiment, each of the modules 72-76 includes LEDs adapted to emit light signals of a specific color. For example, the module 72 may house LEDs (e.g., LEDs 42) adapted to emit only red light signals. Similarly, the module 74 can house LEDs 42 that emit only green light, and the module 76 may house LEDs adapted to emit only blue light. In other exemplary embodiments, each of the modules 72-76 may house LEDs adapted to emit light signals of various colors some of which are not RGB. In still other embodiments, the modules 72-76 may house combinations of LEDs, where each LED is adapted to emit light signals of a different color.

As further illustrated, each of the modules 72-76 are coupled to collimators 78, 80 and 82, respectively. The collimators 78-82 are adapted to efficiently gather light from each of the LEDs 42 disposed within the modules 72-76. The collimators 78-82 are coupled to the modules 72-76 in a manner similar to that discussed above in relation to the collimator 44 of FIG. 2. Accordingly, the collimators 78-82 have attributes and characteristics similar to the collimator 44 incorporated herein by reference. The illumination system 70 further includes three lenslet assemblies 84, 86 and 88 disposed subsequent to the collimators 78-82, respectively. Each of the lenslet assemblies 84-88 includes a plurality of lenslets similar to those associates with the lenslet assembly 46 of the illumination system 12. A number of lenslets incorporated within the lenslet assemblies 84-88 corresponds to the number of LEDs included in the modules 72-76. Further, each of the lenslet assemblies 84-88 are adapted to receive the light signals emanating from the respective modules 72-76. In so doing, the lenslets of the assemblies 84-88 are further adapted to redirect the light onto lenses 90, 92 and 94, respectively.

The lenses 90-94 are similar to the lens 48 discussed above in relation to the illumination system 12 of FIG. 2. Hence, the lenses 90-94 are adapted to collect and focus the light provided by each of the lenslet assemblies 84-88 onto polarization elements 96, 98 and 100. The polarization elements 96-100 are adapted to polarize the light signals emanating from each of the collimators lenses 90-94, respectively. That is, each of the polarization elements may distinctly polarize the light provided by the LEDs 42. For example, in one embodiment, the polarizing element 96 may render the light received from the collimator 78 to be s-polarized. Similarly, the polarizing elements 98 and 100 may render the light emanating from the collimators 80 and 82, respectively, to be p-polarized. Those skilled in the art will appreciate that the polarizing elements 96-100 can be employed in a variety of ways so as to provide different polarization schemes for polarizing the light signals emitted by the LEDs 42.

The illumination system 70 further includes a plurality of imagers 102-106 disposed subsequent to the polarization elements 96-100. The imagers 102-106 are adapted to image the light provided by each of the LEDs 42 of modules 72-26, respectively. The images formed by the imagers 102-106 are, thereafter, provided to an X-cube 108, which combines and provides those images to a light pipe of the video unit 10.

Figure 4:
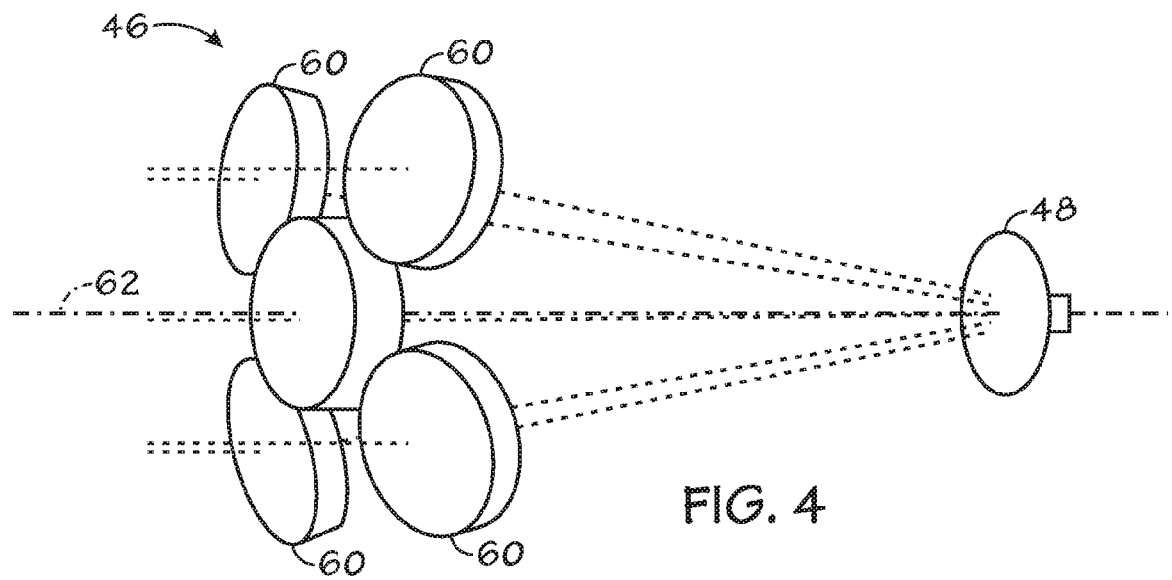
FIG. 4 is a perspective view of a lenslet assembly in accordance with an embodiment of the present invention.

FIG. 4 is perspective view of an illumination system including a lenslet assembly, in accordance with an embodiment of the present technique. The lenslet assembly depicted in FIG. 4 is similar to those discussed herein in relation to FIGS. 2 and 3. As illustrated, the lenslet assembly 46 is disposed subsequent the lens 48. In the illustrated embodiment, the lenslet assembly 46 forms a structure that includes five lenslets 60, corresponding to five LEDs included within the module 40 and or within the modules 72-76 (FIGS. 2 and 3, respectively). Other exemplary embodiments may include lenslet assemblies having a different number of lenslets, for example, such as seven or eleven lenslets, corresponding to a similar number of LEDs. Each of the lenslets 60 may be made up from an optical plastic, such as an acrylic complex or a similar material. Each of the lenslets 60 may be molded into a semi-convex structure having a lens-like structure. In the illustrated embodiment, each of the lenslets 60 may have one flat-shaped side facing the module 40 (FIG. 2), and one relatively curved/convex shaped-side facing the lens 48.

As further illustrated by FIG. 4, each of the lenslets 60 is disposed about an axis 62. While in the illustrated embodiment, the lenslet assembly 46 may be disposed symmetrically transverse relative to the axis 62, other embodiments may include disposing the lenslet assembly 46 asymmetrically transverse relative to the axis 62. Further, each of the lenslets 60 may generally have a unique orientation relative to the axis 62, the module 40 (LEDs 42) and the lens 48. The unique orientation of each of the lenslets 60 relative to the aforementioned components ensures that each of the lenslets 60 optimally captures the light emitted by the respective LEDs disposed within the module 40 and/or the modules 72-76. In other words, each of the lenslets 60 is adapted to optically couple its respective LED 42 to the lens 48.

Figure 5:
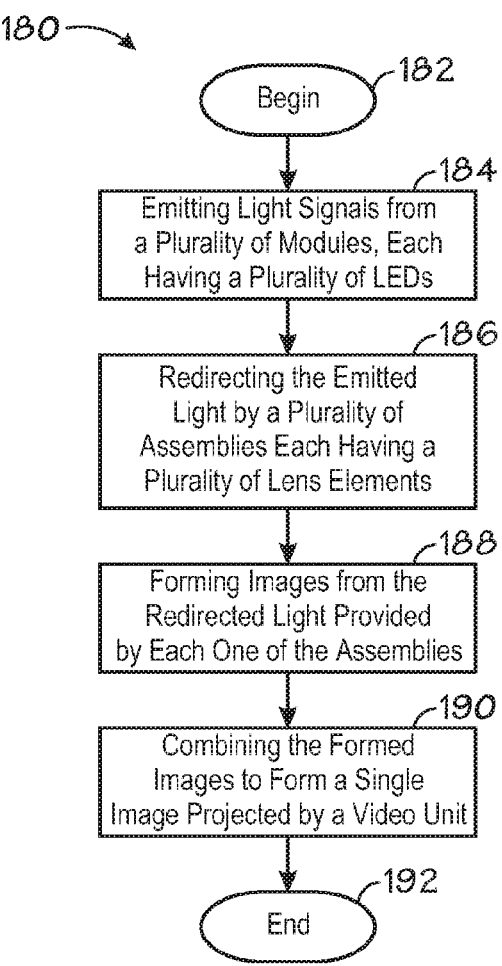
FIG. 5 is a process flow diagram showing a method for illuminating a multi-imaging system, in accordance with an exemplary embodiment of the present invention.

FIG. 5 is a process flow diagram showing a method for illuminating a projection system in accordance with an exemplary embodiment of the present invention. The method is generally referred to by the reference number 180. The method 180 can be applied to the illumination systems 12 and 70 described above in relation to FIGS. 2 and 3. The method 180 begins at block 182. Process flow then proceeds to block 184, in which an illumination system of a video unit emits light by a plurality of modules, such as modules 72-76, where each module includes a plurality of LEDs (e.g., LEDs 42). Block 184 may also include an act of collimating the emitted light, as may be performed by the collimators 78-82. As mentioned above, the collimation increases the amount of light available for projecting an image onto a screen of the video unit. Thereafter, at block 186, the light emitted by each of the modules 72-76 is received by a plurality of lenslet assemblies, such as the lenslet assembly 84-88, adapted to redirect the light emanating by the LEDs towards lenses, such as lenses 90-94 (FIG. and 3 and 4). It should be appreciated that the act of receiving and redirecting the light, as performed at block 186, is applied by each lenslet 60 of each module 84-88 to each light ray emanating from a respective LED contained within the modules 72-76.

From block 186 the method 180 proceeds to block 188, where the light redirected by the lenslet assemblies is received by a plurality of imaging systems, such as the imagers 102-106. Each of the imagers forms an image from the light signals provided by each of the aforementioned lenslet assemblies. Thus, for a system having, for example, three lenslet assemblies, three independent images are formed by the imagers. Block 188 may further include the step of focusing the redirected light by a plurality of lenses before the light is provided to the plurality of imagers. Next, at block 190, the images formed by the imagers 102-106 (FIG. 3) are combined, for example, by an X-cube to form a single image which is, thereafter, projected onto a screen.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. An illumination system, comprising:
    a plurality of modules comprising a plurality of light emitting diodes (LEDs) adapted to emit light;
    a plurality of collimators each configured to receive the light from a respective one of the plurality of modules;
    a plurality of lenslet assemblies comprising a plurality of lens elements, each of the plurality of lens elements configured to receive the light from a respective one of the LEDs through a respective one of the plurality of collimators, wherein a number of plurality of lens elements corresponds to a number of the LEDs, and wherein the plurality of lens elements is adapted to redirect the light emitted by the LEDs on a plurality of lenses each configured to receive the light from a respective one of the plurality of lenslet assemblies; and
    a plurality of imagers each configured to receive the light from a respective lens of the plurality of lenses, wherein each of the imagers forms an image from the light provided by each of the lens elements, respectively.

2. The illumination system of claim 1, comprising a plurality of polarizing elements disposed between the plurality of lenses and the plurality of imagers.

3. The illumination system of claim 1, wherein each of the LEDs is adapted to emit red, green or blue light.

4. The illumination system of claim 1, comprising an X-cube adapted to combine the images formed by the imagers.

5. The illumination system of claim 1, wherein each of the plurality of lenslet assemblies is disposed symmetrically transverse relative to a line that runs therethrough and through a one of the plurality of lenses configured to receive the light from the respective one of the plurality of lenslet assemblies.

6. The illumination system of claim 1, wherein each of the plurality of lenslet assemblies is disposed asymmetrically transverse relative to a line that runs therethrough and through a one of the plurality of lenses configured to receive the light from the respective one of the plurality of lenslet assemblies.

7. The illumination system of claim 1, wherein the plurality of lens elements is adapted to increase the efficiency of light provided to a light pipe of a video unit.

8. A method of operating an illumination system of a video unit, comprising:
    emitting light from a plurality of modules, wherein each of the modules comprises a plurality of light emitting diodes (LEDs);
    collimating the light from the LEDs in a plurality of collimators;
    redirecting the light by a plurality of lenslet assemblies, wherein each of the plurality of lenslet assemblies comprises a plurality of lens elements whose number is equal to a number of the LEDs, and wherein each of the plurality of lens elements is configures to receive the light from a respective LED through a respective collimator;
    collecting and focusing the redirected light by a plurality of lenses, wherein each lens of the plurality of lenses configured to receive the light from a respective lenslet assembly;
    forming images from the redirected light provided by each one of the lenslet assemblies; and
    combining the formed images to form a single image adapted to be projected on a screen by the video unit.

9. The method of claim 8, comprising polarizing the light provided by the plurality of lenslet assemblies.

10. The method of claim 8, comprising pulsing the light emitted by each of the plurality of LEDs.

11. The method of claim 8, comprising emitting red, green and blue light by the plurality of LEDs.

12. The method of claim 10, wherein redirecting comprises receiving light by one of the plurality of lens elements from a respective one of the plurality of LEDs, and transmitting the light onto a respective lens.

13. A video unit, comprising:
    an illumination system, comprising:
        a plurality of modules comprising a plurality of light emitting diodes (LEDs) adapted to emit light;
        a plurality of collimators each configured to receive the light from a respective one of the plurality of modules;
        a plurality of lenslet assemblies comprising a plurality of lens elements, each of the plurality of lens elements configured to receive the light from a respective one of the LEDs through a respective one of the plurality of collimators, wherein a number of plurality of lens elements corresponds to a number of the LEDs, and wherein the plurality of lens elements is adapted to redirect the light emitted by the LEDs on a plurality of lenses each configured to receive the light from a respective one of the plurality of lenslet assemblies; and
        a plurality of imagers each configured to receive the light from a respective lens of the plurality of lenses, wherein each of the imagers forms an image from the light provided by each of the lenses, respectively;
    an imaging system adapted to form an image based on the light received from the illumination system; and
    a projection system adapted to project the image on a screen of the video unit.

14. The video unit of claim 13, comprising a plurality polarizing elements disposed between the plurality of lenses and the plurality of imagers.

15. The video unit of claim 13, wherein each of the LEDs is adapted to emit red, green or blue light.

16. The video unit of claim 13, comprising an X-cube adapted to combine the images formed by the imagers.

17. The video unit of claim 13, wherein the plurality of lens elements are disposed within a plurality of lenslet assemblies.

18. The illumination system of claim 1, wherein each of the plurality of collimators surrounds a respective LED such that the respective LED is partially embedded in the respective collimator.

19. The illumination system of claim 1, wherein each of the lens elements comprises a flat-shaped side facing the respective module and a convex-shaped side facing the respective lens.

* * * * *